United States Patent Office 3,796,641
Patented Mar. 12, 1974

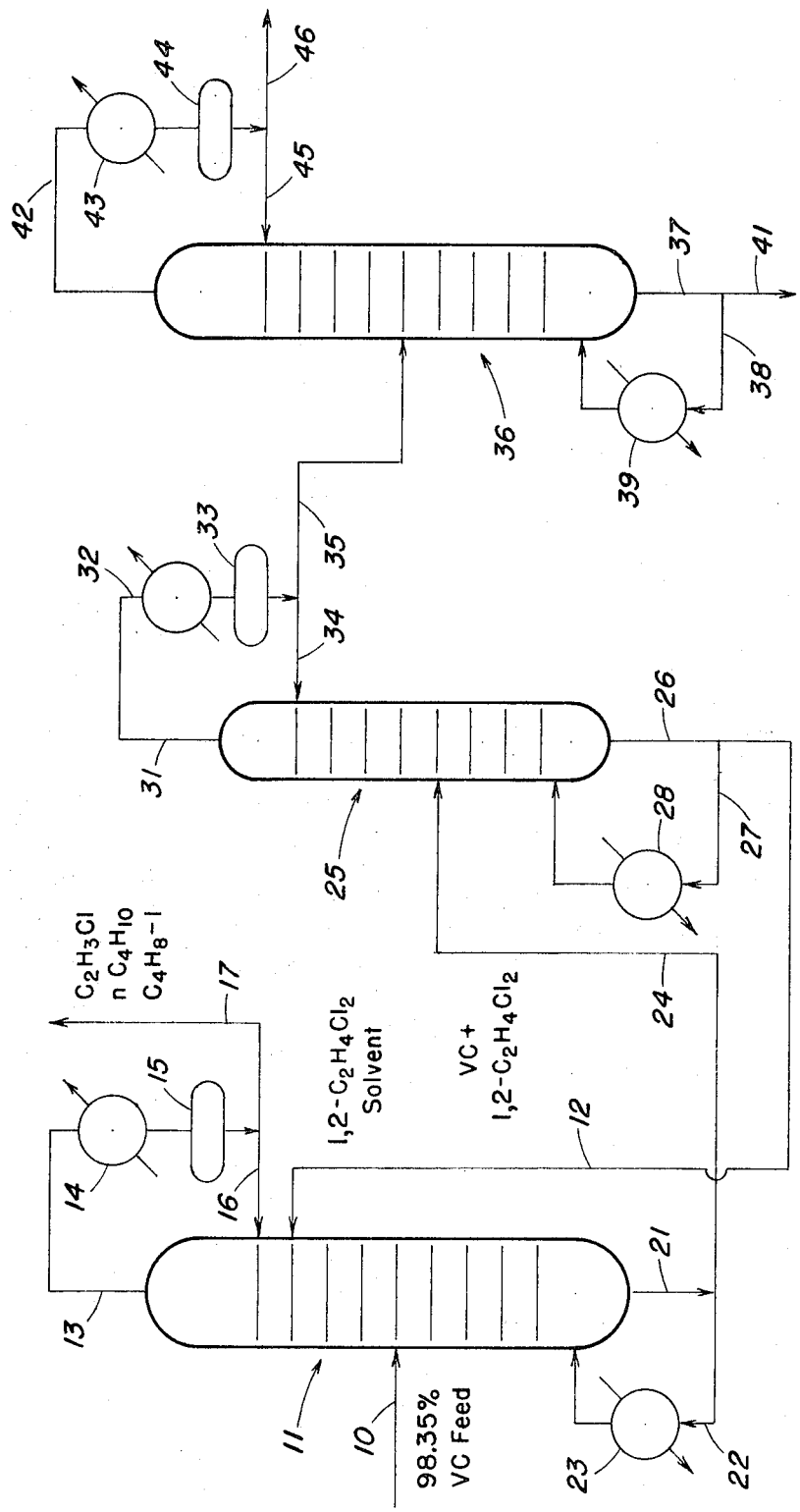

3,796,641
VINYL CHLORIDE RECOVERY WITH DICHLORO-
ETHANE SOLVENT
Herbert Riegel, Maplewood, and Morgan C. Sze, Upper
Montclair, N.J., Harold Unger, Bronx, N.Y., and L. M.
Shipman, Westfield, N.J., assignors to The Lummus
Company, Bloomfield, N.J.
Filed July 19, 1972, Ser. No. 273,047
Int. Cl. B01d 3/40
U.S. Cl. 203—67                                9 Claims

ABSTRACT OF THE DISCLOSURE

Vinyl chloride is separated from a vinyl chloride feed which contains n-butane and/or butene-1 by extractive distillation in the presence of 1,2-dichloroethane. Monomer grade vinyl chloride in the order of 99.99% may be produced.

This invention relates to the recovery of vinyl chloride and more particularly to the recovery of vinyl chloride from close-boiling components.

Monomer grade vinyl chloride is required to be of high purity with commercial vinyl chloride monomer generally approximately 99.95% to 99.99% vinyl chloride.

In the production of vinyl chloride, the vinyl chloride product generally has to be further purified in order to provide monomer grade vinyl chloride, and in some cases, the recovery of high purity vinyl chloride presents some difficulty as the result of the presence of close-boiling components. Thus, for example, in the production of vinyl chloride by the use of molten salts, as described in U.S. applications Ser. Nos. 153,374, filed on June 15, 1971, and 157,496, filed on June 28, 1971, the vinyl chloride product generally includes butene-1, n-butane and methyl chloride as impurities.

The methyl chloride impurity does not present a great amount of difficulty in that the relative volatility between methyl chloride and vinyl chloride is such that the methyl chloride could be separated as an overhead component. The n-butane and butene-1 components, however, have relative volatilities which make their separation from vinyl chloride quite difficult, particularly in view of the fact that at increasing vinyl chloride purity, the volatility of the vinyl chloride with respect to such components decreases.

An object of the invention is to provide for improved recovery of monomer grade vinyl chloride.

A further object of the invention is to provide for recovery of monomer grade vinyl chloride from close-boiling components.

Another object of the invention is to provide for improved separation of monomer grade vinyl chloride from a mixture thereof with n-butane and/or butene-1.

These and other objects of the invention should be more readily apparent from reading the following description of the invention with reference to the accompanying drawings:

The drawing is a simplified schematic diagram of an embodiment of the process of the invention.

The objects of the present invention are broadly accomplished by distilling a mixture of vinyl chloride and butene-1 and/or n-butane in the presence of 1,2-dichloroethane as an extracting agent. The 1,2 - dichloroethane changes the relative volatilities of the n-butane and/or butene-1 in a manner such that n-butane and butene-1 which are normally higher boiling than vinyl chloride are, in the presence of 1,2-dichloroethane, lower boiling than vinyl chloride, and the relative volatilities thereof, with respect to vinyl chloride, are such that the n-butane and/or butene-1 may be separated from the mixture as overhead product.

More particularly, the extractive distillation in the presence of 1,2-dichloroethane may be effected at overhead temperatures which range from about 100° F. to about 200° F., bottoms temperatures which range from about 230° F. to about 325° F., and column pressures which range from about 5 atm. to about 14 atm. (absolute). The 1,2-dichloroethane is added in an amount from about 40 mole percent to about 80 mole percent of total liquid in the column and preferably from about 50 mole to about 60 mole percent, based on the total liquid in the column. In general, the feed stream to the process comprises at least about 95 mole percent vinyl chloride, and more particularly, from about 95 mole percent to about 99 mole percent vinyl chloride.

In some cases, the mixture comprised of vinyl chloride, n-butane and/or butene-1 may also contain other components such as one or more of the following: methyl chloride, cis and trans butene-2 and ethyl chloride, and the teachings of the present invention are equally applicable to mixtures containing such other components. Thus, for example, a mixture of vinyl chloride, butene-1, n-butane, methyl chloride, cis and trans butene-2 and ethyl chloride may be distilled in the presence of 1,2-dichloroethane as an extracting agent, at the hereinabove specified conditions, to recover methyl chloride, n-butane and butene-1 as an overhead product, and vinyl chloride, 1,2-dichloroethane, cis and trans butene-2 and ethyl chloride as a bottoms product.

The bottoms product is then distilled to recover 1,2-dichloroethane as bottoms product which is recycled to the first distillation, and vinyl chloride, cis and trans butene-2 and ethyl chloride as overhead product.

The overhead product is then distilled to recover vinyl chloride, as overhead product, with the remaining components being recovered as bottoms product.

The vinyl chloride, recovered as final product, is of monomer grade; i.e., generally at least 99.95 mol percent vinyl chloride and preferably in the order of 99.99 mol percent vinyl chloride.

The invention will be further described with reference to the accompanying drawing which is illustrative of the invention, but it is to be understood that the scope of the invention is not to be limited thereby.

A feed stream comprised of vinyl chloride, methyl chloride, butene-1, cis and trans butene-2 and ethyl chloride in line 10 is introduced at an intermediate portion of an extractive distillation column 11 operated at overhead temperatures from about 100° F. to about 200° F. bottoms temperatures from about 230° F. to about 325° F. and column pressures from about 5 atm. to about 14 atm. (absolute). 1,2-dichloroethane, as an extracting agent, is introduced through line 12 at the top of column 11. As a result of the introduction of the extracting agent and the operating conditions in column 11, methyl chloride, n-butane and butene-1 are separated, as overhead, from the feed mixture. The overhead is withdrawn from column 11 through line 13, cooled in condenser 14 and collected in reflux drum 15. A portion of the condensed overhead from drum 15 is returned to the top of column 11 through line 16 to meet the reflux requirements therefor, and the remaining portion is recovered in line 17 as net overhead product.

A bottoms product comprised of vinyl chloride, ethyl chloride and cis and trans butene-2 and 1,2-dichloroethane is withdrawn from column 11 through line 21 and a portion thereof passed through line 22, including heater 23, to meet the reboil requirements for column 11. The net bottoms in line 24 is introduced into an intermediate portion of fractional distillation column 25 operated at temperatures and pressures to recover 1,2-dichloroethane as a bottoms product; generally an overhead temperature from about 90° F. to about 135° F., a bottoms temperature from about 300° F. to about 350° F. and a column pressure from about 5 atm. to about 10 atm. (absolute).

A bottoms product of 1,2-dichloroethane is withdrawn from column 25 through line 26, and a portion thereof passed through line 27, including heater 28, to meet the reboil requirements for column 25. The net bottoms product of 1,2-dichloroethane in line 12 is recycled to column 11 as the extracting agent.

An overhead comprised of vinyl chloride, ethyl chloride and cis and trans butene-2 is withdrawn from column 25 through line 31, cooled in condenser 32 and collected in reflux drum 33. A portion of the condensed overhead from drum 33 is returned to the top of column 35 through line 34 to meet the reflux requirements therefor.

The net overhead in line 35 is introduced into fractional distillation column 36 designed and operated to recover vinyl chloride as overhead product, generally an overhead temperature from about 100° F. to about 160° F., a bottoms temperature from about 130° F. to about 200° F. and a column pressure from about 5 atm. to about 15 atm. (absolute).

A bottoms product of ethyl chloride cis and trans butene-2 is withdrawn from column 36 through line 37, and a portion thereof passed through line 38, including heater 39, to meet the reboil requirements for column 36. The net bottoms is recovered in line 41.

An overhead product of high purity vinyl chloride, in the order of 99.99% vinyl chloride, is withdrawn from column 36 through line 42, cooled in condenser 43 and collected in reflux drum 44. A portion of the condensed overhead from reflux drum 44 is returned to the top of column 36 through line 5 to meet the reflux requirements therefor. The net vinyl chloride overhead product is recovered in line 46.

It is to be understood that the hereinabove described specific embodiment is only illustrative of the invention and, therefore, numerous modifications and variations thereof are possible within the spirit and scope of the invention. Thus, for example, the feed could be free of ethyl chloride and cis and trans butene-2 in which case column 36 could be omitted, and the high purity vinyl chloride recovered as the net overhead product from column 25. It is also to be understood that column 36 could also be omitted in situations where one or more of the components, ethyl chloride, cis and trans butene-2 are present in amounts which do not require separation thereof from the vinyl chloride overhead from column 25 to provide the required vinyl chloride purity.

It is also to be understood that although the embodiment has been particularly described with reference to the presence of several impurity components, the embodiment is equally applicable to feeds in which only n-butane and/or butene-1 is present as an impurity.

The above modifications and others should be apparent to those skilled in the art from the teachings herein.

The following examples further illustrate the invention, but it is to be understood that the scope of the invention is not to be limited thereby.

Example I

The following Table I exemplifies the relative volatilities for various impurities with respect to vinyl chloride, in the absence of 1,2-dichloroethane at temperatures from 80° F. to 150° F. and at vinyl chloride concentrations of 95% and higher:

TABLE I

| Component: | Volatility relative to vinyl chloride |
|---|---|
| $CH_3Cl$ | 1.2–1.4 |
| $C_4H_8$-1 | 8.85–0.90 |
| $nC_4H_{10}$ | 0.80–0.95 |

The following Table II exemplifies the relative volatilities of such components with respect to vinyl chloride, in the presence of 53 mol percent 1,2-dichloroethane, at a temperature of about 125° F. and vinyl chloride concentrations relative to the impurities (i.e. in the absence of 1,2-dichloroethane) of 98–99.9 mol percent.

TABLE II

| Component: | Volatility relative to vinyl chloride (average) |
|---|---|
| $CH_3Cl$ | 1.24 |
| $nC_4H_{10}$ | 1.24 |
| $C_4H_8$-1 | 1.14 |

The change in relative volatilities as a result of the use of 1,2-dichloroethane as an extracting agent, permits separation of the three components from vinyl chloride as an overhead product.

Example II

The following is representative of an operation for recovering vinyl chloride from a feed of vinyl chloride, methyl chloride, n-butane and butene-1. The extracting agent is 1,2-dichloroethane in an amount of 6100 lb. moles/hr.

| Component | Line 10 Lb. mol/hr. | Line 10 Mol percent | Line 35 Lb. mol/hr. | Line 35 Mol percent | Line 17 Lb. mol/hr. | Line 17 Mol percent |
|---|---|---|---|---|---|---|
| $CH_3Cl$ | 6.1 | 0.60 | 0.01 | 0.001 | 6.09 | 29.62 |
| $C_2H_5Cl$ | 992.0 | 98.36 | 988.0 | 99.9956 | 4.0 | 19.46 |
| $C_4H_8$-1 | 3.2 | 0.32 | 0.02 | 0.002 | 3.18 | 15.47 |
| $nC_4H_{10}$ | 7.3 | 0.72 | 0.013 | 0.0014 | 7.287 | 35.45 |
| Total | 1,008.6 | 100.00 | 988.043 | 100.0000 | 20.557 | 100.00 |
| Column | | | | | 11 | 25 |
| Temperature, °F., top/bottom | | | | | 120/237 | 130/341 |
| Pressure, p.s.i.a., top/bottom | | | | | 80/90 | 124/129 |
| Reflux, reflux/distillate | | | | | 260 | 3 |
| Trays, actual | | | | | 200 | 40 |
| Column diameter | | | | | 13' | 11'-6'' |
| Reboiler load, mm. B.t.u./hr. | | | | | 66 | 60 |

Example III

The following is representative of an operation for recovering vinyl chloride from a feed of vinyl chloride, ethyl chloride, n-butane, butene-1, and cis and trans-butene-2. The extracting agent is 1,2-dichloroethane in an amount of 6100 lb. mol./hr.

| Component | Line 10 Lb. mol/hr. | Line 10 Mol percent | Line 46 Lb. mol/hr. | Line 46 Mol percent | Lines 17 and 41 Lb. mol/hr. | Lines 17 and 41 Mol percent |
|---|---|---|---|---|---|---|
| $CH_3Cl$ | 6.1 | 0.603 | 0.01 | 0.0011 | 6.09 | 24.58 |
| $C_2H_3Cl$ | 992 | 98.092 | 986.50 | 99.9975 | 5.5 | 22.20 |
| $C_4H_8$-1 | 3.2 | 0.316 | 0.006 | 0.0006 | 3.194 | 12.89 |
| $nC_4H_{10}$ | 7.3 | 0.722 | 0.006 | 0.0006 | 7.294 | 29.44 |
| $tC_4H_8$-2 | 2 | 0.198 | 0.002 | 0.0002 | 1.998 | 8.06 |
| $cC_4H_8$-2 | 0.7 | 0.069 | | | 0.7 | 2.83 |
| Total | 1,011.3 | 100.000 | 986.524 | 100.0000 | 24.776 | 100.00 |
| Column | | | 11 | | 25 | 36 |
| Temperature, °F., top/bottom | | | 120/237 | | 130/341 | 118/140 |
| Pressure, p.s.i.a., top/bottom | | | 80/90 | | 124/129 | 105/115 |
| Reflux, reflux/distillate | | | 260 | | 3 | 4 |
| Trays, actual | | | 200 | | 40 | 105 |
| Column diameter | | | 13′ | | 11′-6″ | 7′ |
| Reboiler load, mm. B.t.u./hr | | | 60 | | 60 | 26 |

The teachings of the present invention are particularly applicable to purifying to monomer grade vinyl chloride the vinyl chloride obtained as reaction product from the chlorination of ethane and/or ethylene by the use of molten salts as described in the aforemention U.S. application Serial Nos. 153,374 and 157,496, which are hereby incorporated by reference. In such a process, the vinyl chloride product employed as feed in the present invention generally includes, as impurities, methyl chloride, n-butane, butene-1, cis and trans butene-2 and ethyl chloride.

The present invention is particularly advantageous in that vinyl chloride may be effectively separated from a feed mixture including n-butane and/or butene-1, as impurities, to provide a monomer grade vinyl chloride.

Numerous modifications and variations of the present invention are possible in light of the above and, therefore, within the scope of the appended claims, the invention may be practiced in a manner other than as particularly described.

What is claimed is:

1. A process for recovering monomer grade vinyl chloride from a feed mixture comprising vinyl chloride and at least one member selected from the group consisting of n-butane and butene-1, comprising:
   distilling the feed mixture in the presence of 1,2-dichloroethane as an extracting agent to recover as a bottoms product a mixture comprising 1,2-dichloroethane and vinyl chloride; and recovering from said bottoms product by distillation monomer grade vinyl chloride.

2. The process of claim 1 wherein said 1,2-dichloroethane is present in amount from about 40 mol percent to about 80 mol percent based on the total liquid present during the distilling of said feed mixture.

3. The process of claim 1 wherein said distillation in the presence of 1,2-dichloroethane is effected at an overhead temperature from about 100° F. to about 200° F., a bottoms temperature from about 230° F. to about 325° F. and a pressure from about 5 to about 14 atm. (absolute).

4. The process of claim 3 wherein said feed mixture comprises from about 95 to about 99 mol percent vinyl chloride.

5. A process for recovering monomer grade vinyl chloride from a feed mixture comprising vinyl chloride, n-butane, butene-1 and methyl chloride, comprising:
   distilling the feed mixture in the presence of 1,2-dichloroethane as an extracting agent to recover an overhead comprising n-butane, butene-1 and methyl chloride and a bottoms comprising vinyl chloride and 1,2-dichloroethane; and recovering from said bottoms, by distillation monomer grade vinyl chloride.

6. The process of claim 5 wherein the feed mixture further comprises at least one member selected from the groups consisting of ethyl chloride, cis butene-2 and trans butene-2, said monomer grade vinyl chloride being recovered by distilling said bottoms to recover vinyl chloride overhead comprising vinyl chloride and said at least one member and distilling said vinyl chloride overhead to recover said monomer grade vinyl chloride.

7. The process of claim 6 wherein said 1,2-dichloroethane is present in amount from about 40 mol percent to about 80 mol percent based on the total liquid present during the distilling of said feed mixture.

8. The process of claim 7 wherein said distillation in the presence of 1,2-dichloroethane is effected at an overhead temperature from about 100° F. to about 200° F., a bottoms temperature from about 230° F. to about 325° F. and a pressure from about 5 to about 14 atm. absolute.

9. The process of claim 8 wherein said feed mixture comprises from about 95 to about 99 mol percent vinyl chloride.

References Cited
UNITED STATES PATENTS
3,419,629  12/1968  Ozero _____ 260—656 R
3,244,755   4/1966  Wofford _____ 260—656 R

FOREIGN PATENTS
1,288,594   2/1969  Germany _____ 260—656 R

NORMAN YUDKOFF, Primary Examiner
F. SEVER, Assistant Examiner

U.S. Cl. X.R.

260—656 R